United States Patent [19]
Mossberg et al.

[11] Patent Number: 6,034,976
[45] Date of Patent: Mar. 7, 2000

[54] METHOD AND APPARATUS FOR LASER FREQUENCY STABILIZATION

[75] Inventors: Thomas W. Mossberg; Christoph Greiner; Bryan Boggs, all of Eugene, Oreg.

[73] Assignee: State of Oregon Acting by and through the State Board of Higher Education on Behalf of the University of Oregon, Eugene, Oreg.

[21] Appl. No.: 09/265,186

[22] Filed: Mar. 9, 1999

Related U.S. Application Data

[60] Provisional application No. 60/077,435, Mar. 9, 1998.

[51] Int. Cl.[7] .................................................. H01S 3/13
[52] U.S. Cl. .............................. 372/32; 372/20; 372/28; 372/31; 372/38
[58] Field of Search ................................ 372/32, 20, 31, 372/38, 28

[56] References Cited

U.S. PATENT DOCUMENTS

| | | | |
|---|---|---|---|
| 4,856,009 | 8/1989 | Hall et al. | 372/32 |
| 5,153,888 | 10/1992 | Imamura et al. | 372/32 |
| 5,548,402 | 8/1996 | Nogiwa | 372/32 |
| 5,553,087 | 9/1996 | Telle | 372/38 |
| 5,923,458 | 7/1999 | Fuse et al. | 372/28 |

OTHER PUBLICATIONS

Boggs et al., Laser Frequency Stabilization by Means of Optical Self–Heterodyne Beat–Frequency Control, Optical Society of America, vol. 23, No. 16, pp. 1280–1282, (Aug. 15, 1998).

Chen, Ying T., Use of Single–Mode Optical Fiber in the Stabilization of User Frequency, Applied Optics, vol. 28, No. 11, pp. 2017–2021, (Jun. 1, 1989).

de Labachelerie et al., The Frequency Control of Laser Diodes, Journal de Physique III, vol. 2, No. 9, pp. 1557–1589, (1992).

Drever, R.W.P., Laser Phase and Frequency Stabilization Using an Optical Resonator, Applied Physics B 31, pp. 97–105, (1983).

Hamilton, M.W., An Introduction to Stabilized Lasers, Contemporary Physics, vol. 30, No. 1, pp. 21–33, (1989).

Lin et al., Demonstration of 8–Gbit/in.$^2$ Areal Storage Density Based on Swept–Carrier Frequency–Selective Optical Memory, Optics Letters, vol. 20, No. 15, (Aug. 1, 1995).

Ohtsu et al., Frequency Control of Semiconductor Lasers, Journal of Applied Physics, vol. 73, No. 12, pp. R1–R17, (Jun. 15, 1993).

(List continued on next page.)

*Primary Examiner*—Leon Scott, Jr.
*Attorney, Agent, or Firm*—Klarquist Sparkman Campbell Leigh & Whinston, LLP

[57] ABSTRACT

A method and apparatus for laser frequency stabilization and precise laser frequency tuning comprises splitting a laser beam into two beam portions and recombining the two portions after they traverse differing optical distances. The thus-processed combined beam exhibits a time variation in intensity, the time variation being a function of the time rate of change of the laser beam. A signal proportional to the laser frequency's time rate of change is derived from the time variation of the processed beam's intensity and used to generate a control signal to provide feedback to control the laser frequency, thereby providing for laser frequency stabilization. Precise laser frequency tuning may be achieved by introducing a controlled variation in the derived signal, such as by adjusting a frequency differential introduced between the beam portions, or by otherwise introducing a controlled variation in the signal derived from the processed beam. The timescale over which laser frequency stabilization is achieved may be increased or decreased, and the bandwidth of the stabilization capability increased, by use of one or more additional processed and combined beams having time delays, between the portions to be combined, different from the corresponding time delay in the first processed beam and from each other.

24 Claims, 2 Drawing Sheets

OTHER PUBLICATIONS

Reis[1] et al., Influence of Extrinsic FM Noise on Laser Diode Linewidth Measured by Self–Heterodyning, Optics Communications, vol. 57, No. 4, pp. 269–273, (Mar. 15, 1986).

Saito et al., Frequency Modulation Noise and Linewidth Reduction in a Semiconductor Laser by Means of Negative Frequency Feedback Technique, Applied Physics, vol. 46, No. 1, (Jan. 1, 1985).

Wieman, Carl E., Using Diodes Lasers for Atomic Physics, Review of Scientific Instruments, vol. 62, No. 1, pp. 1–20 (Jan. 1991).

METHOD AND APPARATUS FOR LASER FREQUENCY STABILIZATION

This application claims priority from Provisional Application number 60/077,435, filed Mar. 9, 1998.

FIELD OF THE INVENTION

The present invention relates to methods and apparatus for laser frequency stabilization and control including precise laser frequency tuning.

BACKGROUND

Precise frequency control and high spectral purity are important for many laser applications including high-resolution spectroscopy, precision interferometric measurement, frequency-selective optical data storage, and optical communications. Various methods and apparatus have been employed in attempts to achieve such frequency control.

In one approach, feedback is used to minimize the frequency offset from an absolute frequency reference, such as an atomic or molecular absorption line. See, e.g., M. W. Hamilton, Contemporary Phys. 30, 21, p. 25 (1989). But such methods depend upon the availability of a reference substance having an absorption line at the desired frequency, and thus cannot stabilize a laser at an arbitrary frequency. Further, the range and speed of tuning are limited because of the large magnetic fields required to frequency-shift the absorption resonances of the atomic or molecular systems of the reference substance. Moreover, a small frequency modulation of the laser is typically required in order to generate the feedback signal, placing an upper limit on the spectral purity attainable.

In another approach, a relatively stable "master" laser is used to control the frequency of an unstable "slave" laser. Such methods require the added complexity of a second laser. More significantly, the master laser must have an appropriate frequency relative to the frequency at which the slave laser is to be stabilized, and relatively stable lasers having such an appropriate frequency may not be readily available. Furthermore, the resulting stability is only as good as that of the master laser.

In yet another third approach, a reference cavity may be used to stabilize a laser. See. e.g., M. Ohtsu, K. Nakagawa, M. Kuorogi, W. Wang, J. Appl. Phys. 73, 1 (1993) and R. W. P. Drever, J. L. Hall, F. V. Kowalski, J. Hough, G. M. Ford, A. J. Munley, H. Ward, Appl. Phys. B 31, 97 (1983). These methods allow tuning at arbitrary frequencies, but the tuning speed is slow because the cavity length must be varied, typically by mechanical means. The stability achieved is limited to the stability of the reference cavity.

In still another approach, two self-referenced interferometric schemes have been proposed to control the frequency of a laser (see J. Hall, U.S. Pat. No. 4,856,009 and Y. T. Chen, Appl. Opt. 28, 2017 (1989)). While these methods allow the initial stabilization of a laser at an arbitrary frequency, subsequent stabilizations can occur only at a set of discrete frequencies relative to the initial frequency. More significantly, the feedback electronics must be actively adjusted in order to stabilize the laser at frequencies other than the initial frequency.

SUMMARY OF THE INVENTION

The present invention provides a method and apparatus for laser frequency stabilization and precise laser frequency tuning. In brief, the method and apparatus of the present invention comprises splitting a laser beam to be frequency controlled into two beam portions which form the arms of an interferometric system. At the output of the interferometer, the beams are recombined after having traveled different optical distances, producing a time delay or differential between the beam portions. A particular realization of the invention also comprises the introduction of a frequency differential between the beam portions. The thus-processed combined beam exhibits a time variation in intensity, the time variation being a function of the time rate of change of the laser beam frequency. A signal proportional to the laser beam frequency's time rate of change is derived from the processed beam and used to generate a control signal to provide feedback to control the laser frequency, thereby providing for laser frequency stabilization. Precise laser frequency tuning may be achieved by introducing a controlled deviation or variation in the signal derived from the processed beam, such as by adjusting the frequency differential introduced between the beam portions, or by otherwise introducing a controlled deviation or variation in the signal derived from the processed beam and/or in the feedback signal to the laser. Continuous tuning may thus be achieved without external frequency references and without readjustment of the signal processing circuits downstream of the processed beam. The timescale over which frequency stabilization can be achieved may be increased or decreased as needed and the bandwidth of the stabilization capability broadened by including in parallel with the first processed beam, one or more additional processed beams comprising beam portions having time delays different from that of the beam portions of the first processed beam. The time delay(s) may be selected as needed for optimal stability at desired timescale(s). Further features and advantages of the invention will be apparent from the description below.

DETAILED DESCRIPTION

Figure 1:
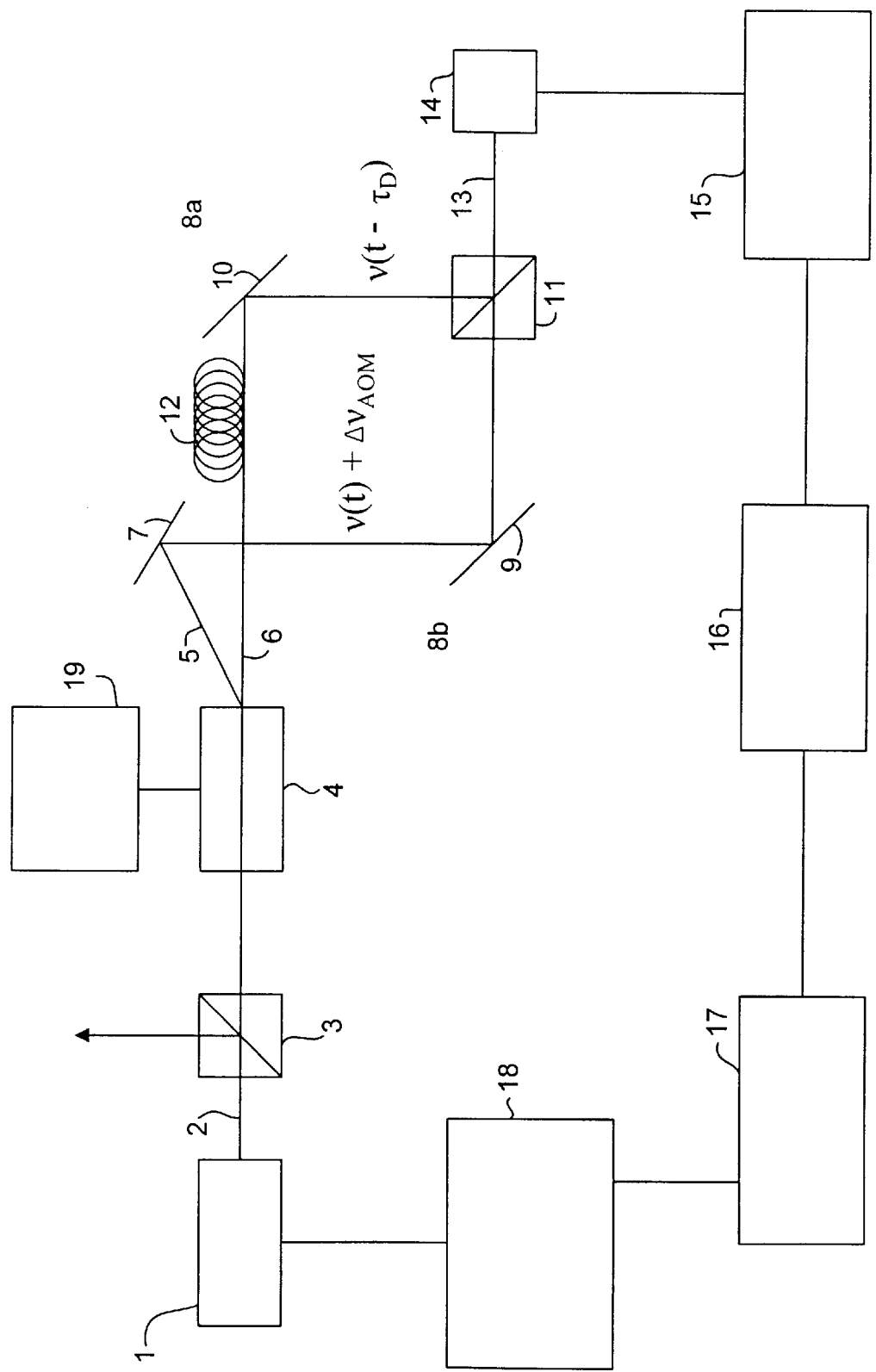
FIG. 1 is a schematic diagram, partially in block form, of an embodiment of an apparatus in accordance with the present invention, and which may be used to practice the methods of the present invention.

Referring to FIG. 1, a laser 1, the frequency of which is to be controlled, produces a laser beam 2. A first beam splitter 3 extracts a portion of the laser beam as the output from the apparatus. (As used herein, the term laser is intended in a generic sense, covering a wide scope of coherent radiation sources.) The laser beam 2 is subsequently split by a beam-deflecting acousto-optic modulator ("AOM") 4 into a first deflected, frequency-shifted beam portion 5 and a second undeflected beam portion 6. A frequency shift $\Delta v_{AOM}$=75 MHz was utilized in a working example (see Greiner, et al., Optics Letters 23:16 p. 1280 (Aug., 1998), incorporated herein by reference). Laser beam portion 6 is subsequently coupled into the long (time-delayed) arm 8a of a Mach-Zehnder interferometer comprising mirrors 9 and 10 and second beam splitter 11. The time delay $\tau_D$ in arm 8a, ($\tau_D$=11 μs in the working example) may be created by an optical fiber 12. The use of single-mode polarization-maintaining optical fiber can be advantageous, however, it is not necessary for proper operation. The frequency-shifted beam portion 5 passes through the short arm 8b of the interferometer via mirror 7. At the output port of the interferometer, the light fields $E_S$ and $E_L$, from the short and long arms respectively, can be written as:

$$E_s(t) = \varepsilon(t)\exp\left\{-i2\pi \int_{t_r}^{t} v(t')dt'\right\}\exp\{-i[2\pi\Delta v_{AOM}(t-t_r)+\eta]\} \quad (1)$$

and $$E_L(t) = \alpha\varepsilon(t-\tau_D)\exp\left\{-i2\pi \int_{t_r}^{t-\tau_D} v(t')dt'\right\} \quad (2)$$

Here $\varepsilon(t)$ us the real-valued amplitude of $E_S$, $\alpha$ is a real-valued constant, $t_r$ is a reference time, $v(t)$ is the instantaneous frequency of the electric field before the AOM, and $\eta$ denotes the phase of the AOM at $t=t_r$. Addition of the two fields at the output of the interferometer produces a processed beam 13 with a time-varying intensity given by:

$$I_{beat}(t) \propto 2\alpha\varepsilon(t-\tau_D)\cos\left[2\pi\left(\int_{t-\tau_D}^{t} v(t')dt' + \Delta v_{AOM}t + \eta\right)\right] \quad (3)$$

The processed beam's intensity is detected by a photodetector 14 and filtered by a bandpass filter 15. The bandwidth of the filter in the working example was 50–150 MHz. A phase-locked loop 16 is employed as an FM demodulator to convert the beat signal frequency into a voltage $V_{PLL}(t)$ according to:

$$V_{PLL}(t) \propto v_{beat}(t) - v_{PLL} = \quad (4)$$
$$\frac{d}{dt}\int_{t-\tau_D}^{t} v(t')dt' + \Delta v_{AOM} - v_{PLL} = v(t) - v(t-\tau_D) + \text{const.}$$

For the working example, $V_{PLL} \approx 75$ MHz nearly matching $\Delta v_{AOM}$. For frequency stabilization the constant term can be eliminated through suitable electronic filters which are well-known in the art.

When $v(t)$ changes slowly over a delay time $\tau_D$ the error signal is proportional to the time derivative of the laser frequency $$V_{PLL}(t) \propto v_{beat}(t) - v_{PLL} \approx \tau_D \frac{dv(t)}{dt}. \quad (5)$$

In this limit, subsequent integration electronics 17 (as known well in the art) will yield a voltage that is proportional to the overall laser frequency excursion during the integration time. The integrated signal is subsequently used to provide negative feedback to the laser via a laser frequency control 18, thereby stabilizing the laser frequency. Laser frequency control 18 typically comprises means known in the art such as piezo-electrically actuated cavity mirror or intra-cavity electro-optic phase modulators.

Note that the approximation (5), and thus the time delay of the interferometer, determines the time scale over which frequency stabilization is optimal. If $v(t)$ is not a slowly-varying function over a delay time $\tau_D$ the error signal $V_{PLL}(t)$ can still be used for frequency stabilization if suitable phase control and amplification electronics (as are well known in the art) are used in the circuitry of FIG. 1.

Figure 2:
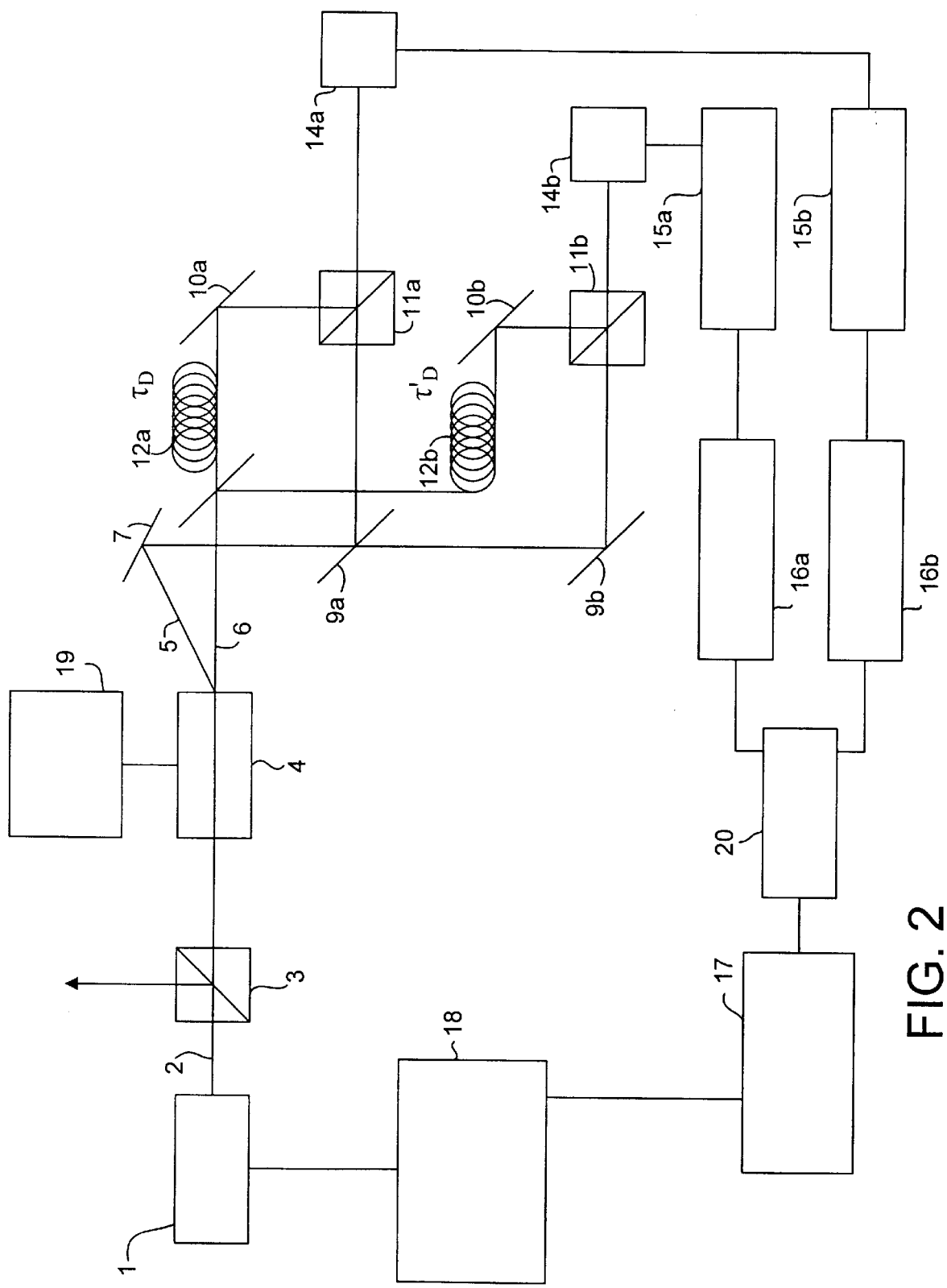
FIG. 2 is a schematic diagram, partially in block form, of another embodiment of an apparatus in accordance with the present invention, which may also be used to practice the methods of the present invention.

Another embodiment in accordance with the present invention that allows for frequency stabilization over an extended bandwidth is depicted in FIG. 2. The same or similar reference characters are used to denote the same or similar components as in FIG. 1. A second interferometer is employed, identical to the one depicted in FIG. 1, except for a longer delay time $\tau'_D$. (For example, $\tau'_D$ may be 100 $\mu$s while $\tau_D$ remains at about 10 $\mu$s, allowing for a ten-fold bandwidth increase as compared to the working example of the embodiment of FIG. 1). After detection of the two beat signals and frequency demodulation thereof, the signals from phase-locked loops 16a and 16b are combined (using adding electronics 20 well known in the art) integrated, and fed back to the laser. It will be understood that the embodiment of FIG. 2 may be generalized to a system that incorporates more than two interferometers all with different time delays, thus allowing tailoring of the frequency stabilization time scale.

A further aspect of the invention relates to precise laser frequency tuning control. Referring to FIG. 1, a voltage-controlled oscillator ("VCO") 19 is connected to the acousto-optic deflector allowing for control of $\Delta v_{AOM}$ via control of the oscillator's input voltage. This can typically be done by an electronic signal generator as known in the art. In the presence of large feedback gain the error signal of Equation 4 above is zeroed and the following condition is satisfied:

$$v(t) - v(T-\tau_D) \approx v_{PLL} - \Delta v_{AOM} \quad (6)$$

Each value of $\Delta v_{AOM}$ corresponds to a specific time rate of change of laser frequency. Therefore control of $\Delta v_{AOM}$ provides a means of laser frequency adjustment. When $\Delta V_{AOM} = V_{PLL}$, the laser frequency will remain stable. This is a specific example relating to the aspect of controlled laser frequency tuning. It will be understood that the same effect may achieved by adjustment of $v_{PLL}$ or by use of an additional electrical signal introduced to the control circuitry.

The invention has been described herein with reference to a particular embodiments, but variations within the spirit and scope of the invention will occur to those skilled in the art. For example, it will be understood that an optical delay line other than an optical fiber can be used, and that various other circuit configurations can be use to implement the functions of the circuitry in FIG. 1. Accordingly, the scope of the invention is as defined in the appended claims.

We claim:

1. A method for stabilizing the frequency of a laser, comprising the steps of:

generating, from a beam of the laser, a processed beam having a time-varying intensity, the time variation of the processed beam's intensity being a function of the time rate of change of the frequency of the laser;

deriving, from said time variation, a signal proportional to the time rate of change of the frequency of the laser; and employing the derived signal as feedback to stabilize the laser frequency.

2. The method as defined by claim 1, wherein said step of generating comprises:

splitting the laser beam into first and second beam portions and introducing a frequency differential between the first and second beam portions; and combining said first and second beam portions after the first and second beam portions have traversed optical distances of different lengths; the processed beam comprising said combined beams.

3. The method as defined by claim 1, wherein the step of deriving comprises employing a photo-detector and a phase-locked loop operating as a frequency demodulator.

4. The method as defined by claim 1, wherein the step of employing comprises producing a control signal as a function of said derived signal and stabilizing the laser frequency with the control signal.

5. A method for precise laser frequency tuning control, comprising the steps of:
generating, from a beam of the laser, a processed beam having a time-varying intensity, the time variation of the processed beam's intensity being a function of the time rate of change of the frequency of the laser;
introducing a frequency modulation in the time variation of the processed beam's intensity;
deriving, from said time variation, a signal proportional both to the time rate of change of the frequency of the laser and to said frequency modulation;
producing a control signal as a function of said derived signal; and
tuning the laser frequency with the control signal.

6. The method as defined by claim 5, wherein said step of deriving comprises employing a photo-detector and a phase-locked loop operating as a frequency demodulator.

7. The method as defined by claim 5, wherein said step of generating said processed beam comprises:
splitting said laser beam into first and second beam portions;
introducing a frequency differential between said first and second beam portions;
combining said first and second beam portions after the first and second beam portions have traversed optical distances of different lengths, said processed beam comprising said combined beams.

8. The method as defined by claim 7, wherein the step of introducing a frequency modulation comprises varying said frequency differential introduced between said first and second beam portions.

9. A method for precise laser frequency tuning and control, comprising the steps of:
generating, from a beam of the laser, a processed beam having a time-varying intensity, the time variation of the processed beam's intensity being a function of a time rate of change of the frequency of the laser;
deriving, from said time variation, a first signal that is proportional to the time rate of change of the frequency of the laser;
providing a second signal to vary the laser frequency; and
producing a control signal as a function of the first and second signals; and
tuning the laser frequency with the control signal.

10. The method as defined by claim 9, wherein said step of generating said processed beam comprises:
splitting said laser beam into first and second beam portions;
introducing a frequency differential as between said first and second beam portions;
combining said first and second beam portions after the first and second beam portions have traversed optical distances of different lengths; said processed beam comprising said combined beams.

11. The method as defined by claim 9, wherein said step of deriving said first signal comprises employing a photo-detector and a phase-locked loop operating as a frequency demodulator.

12. The method as defined by claim 11, wherein said second signal comprises a voltage signal controlling a reference oscillator of the phase-locked loop.

13. Apparatus for controlling the frequency of a laser, comprising:
a laser for generating a laser beam;
means for processing the laser beam to obtain a processed beam having a time-varying intensity, said time variation in said processed beam's intensity being a function of the time rate of change of the frequency of the laser;
means for deriving, from said time variation in said processed beam's intensity, a signal that is proportional to the time rate of change of the frequency of the laser;
means for producing a control signal as a function of said derived signal; and means for controlling the laser frequency with the control signal.

14. Apparatus as defined by claim 13, wherein said means of generating said processed beam comprises:
means for splitting said laser beam into first and second beam portions;
means for introducing a frequency differential as between said beam portions;
means for combining said first and second beam portions;
means to create optical distances of different lengths as between the first and second beam portions.

15. Apparatus as defined by claim 14, further comprising means to vary said frequency differential introduced between said first and second beam portions so as to introduce a frequency modulation in said time variation of said processed beam's intensity.

16. Apparatus as defined by claim 13, wherein said means of deriving, from said time variation in said processed beam's intensity, a signal that is proportional to the time rate of change of the frequency of the laser, comprises a phase-locked loop that operates as a frequency demodulator.

17. Apparatus as defined by claim 13, further comprising means for introducing a frequency modulation in said processed beam intensity, so as to vary the frequency of the laser.

18. Apparatus as defined by claim 13, further comprising means for introducing an additional electrical control signal, so as to vary the frequency of the laser.

19. Apparatus for producing a laser beam having a stabilized frequency, the apparatus comprising:
a laser for generating a laser beam;
first and second optical paths arranged so as to transmit respective first and second portions of the laser beam, the first and second optical paths having differing optical lengths;
a detector for receiving, in combination, the first and second portions of the laser beam from the first and second optical paths and for detecting a time variation in the intensity of the combined first and second portions, the time variation in the intensity being a function of the time rate of change of a frequency of the laser;
a signal processing and control system for deriving a signal representing the time rate of change of the frequency of the laser and for stabilizing the laser frequency based on the derived signal.

20. Apparatus as defined by claim 19, wherein said signal processing and control system comprises a phase-locked loop arranged to operate as a frequency demodulator.

21. Apparatus as defined in claim 20 wherein the phase-locked loop comprises a reference oscillator to which a modulation may be introduced for tuning the laser frequency.

22. Apparatus as defined by claim 19, further comprising a frequency-shifter for shifting the frequency of the first portion of the laser beam.

23. Apparatus as defined in claim 22 wherein the frequency-shifter is capable of being modulated to introduce a frequency modulation in said processed beam intensity so as to tune the frequency of the laser.

24. Apparatus as defined in claim 19, wherein said signal processing and control system is structured and arranged so as to derive a laser frequency control signal, for controlling and stabilizing the laser frequency, both from said derived signal and from a tuning control signal provided to said signal processing and control system, so as to allow tuning of the laser frequency via modulation of said tuning control signal.

* * * * *

UNITED STATES PATENT AND TRADEMARK OFFICE
CERTIFICATE OF CORRECTION

PATENT NO. : 6,034,976
DATED : March 7, 2000
INVENTOR(S) : Mossberg et al.

It is certified that error appears in the above-identified patent and that said Letters Patent is hereby corrected as shown below:

Title page,
Item [56], References Cited, under the heading "OTHER PUBLICATIONS,"

The first-listed publication should be corrected to read -- Greiner et al., Laser Frequency Stabilization by Means of Optical Self-Heterodyne Beat-Frequency Control, Opt. Lett. 23:1280-1282, (Aug. 15, 1998). --.

The Chen publication should be corrected to read -- Chen, Ying T., Use of Single-Mode Optical Fiber in the Stabilization of Laser Frequency, Applied Optics, vol. 28, No. 11, pp. 2017-2021, (Jun. 1, 1989). --.

The Lin et al. publication should be corrected to read -- Lin et al., publication should be corrected to read -- Lin et al., Demonstration of 8-Gbit/in.2 Areal Storage Density Based on Swept-Carrier Frequency-Selective Optical Memory, Optics Letters, vol. 20, No. 15, pp. 1358-1660 (Aug. 1, 1995). --.

Title page (page 2),
Item [56], References Cited, under the heading "OTHER PUBLICATIONS,"

The Reis[1] et al. publication should be corrected to read -- Ries et al., Influence of Extrinsic FM Noise on Laser Diode Linewidth Measured by Self-Heterodyning, Optics Communications, vol. 57, No. 4, pp. 269-273, (Mar. 15, 1986). --.

The Saito et al. publication should be corrected to read -- Saito et al., Frequency Modulation Noise and Linewidth Reduction in a Semiconductor Laser by Means of Negative Frequency Feedback Technique, Applied Physics, vol. 46, No. 1, pp. 3-5 (Jan. 1, 1985). --.

Column 1,
Line 45, "See." should be -- See, --.

Column 2,
Line 58, "$\Delta v_{AOM}$=75 MHz" should be -- $\Delta \upsilon_{AOM} = 75$ MHz --.

Column 3,
Line 13, "us" should be -- is --.
Line 14, "v(t)" should be -- $\upsilon(t)$ --.

UNITED STATES PATENT AND TRADEMARK OFFICE
CERTIFICATE OF CORRECTION

PATENT NO. : 6,034,976
DATED : March 7, 2000
INVENTOR(S) : Mossberg et al.

It is certified that error appears in the above-identified patent and that said Letters Patent is hereby corrected as shown below:

<u>Column 3 (contd.)</u>
Line 20, equation (3) should be corrected to read as follows:

$$I_{bm}(t) \propto 2\alpha\epsilon(t)\epsilon(t - \tau_D) \cos\left[2\pi\left(\int_{t-\tau_D}^{t} v(t')dt' + \Delta v_{AOM} t + \eta\right)\right] \quad (3)$$

Line 37, "$V_{PLL} \approx 75$ MHz" should be -- $\upsilon_{PLL} \approx 75$ MHz --.
Line 38, "$\Delta v_{AOM}$" should be -- "$\Delta\upsilon_{AOM}$ --.
Line 40, "v(t)" should be -- $\upsilon$(t) --.
Line 42, a colon -- : -- should be inserted after "frequency".
Line 59, "v(t)" should be -- $\upsilon$(t) --.

<u>Column 4,</u>
Line 6, "FIG. 1)." should be -- FIG. 1.) --.
Line 18, "$\Delta v_{AOM}$" should be -- "$\Delta\upsilon_{AOM}$ --.
Line 26, "$\Delta v_{AOM}$" should be -- "$\Delta\upsilon_{AOM}$ --.
Line 27, "$\Delta v_{AOM}$" should be -- "$\Delta\upsilon_{AOM}$ --.
Line 29, "$\Delta v_{AOM} = v_{PLL}$" should be -- "$\Delta\upsilon_{AOM} = \upsilon_{PLL}$ --.
Line 32, "$v_{PLL}$" should be -- $\upsilon_{PLL}$ --.
Lines 35-36, "to a particular embodiments" should be -- to particular embodiments --.
Line 40, "can be use to" should be -- can be used to --.

Signed and Sealed this

Twentieth Day of November, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,034,976 | Page 1 of 1 |
| APPLICATION NO. | : 09/265186 | |
| DATED | : March 7, 2000 | |
| INVENTOR(S) | : Mossberg et al. | |

It is certified that error appears in the above-identified patent and that said Letters Patent is hereby corrected as shown below:

Column 1, line 3, (after title, before line 4) insert --This invention was made with government support under Grant # F49620-96-1-0259 awarded by the Department of the Air Force. The government has certain rights in the invention.--

Signed and Sealed this
Third Day of April, 2012

David J. Kappos
*Director of the United States Patent and Trademark Office*